United States Patent [19]
Ikeyama et al.

[11] Patent Number: 6,100,660
[45] Date of Patent: Aug. 8, 2000

[54] CURRENT SUPPLY CONTROLLER FOR AN ELECTRIC MOTOR

[75] Inventors: Takeshi Ikeyama; Teruo Tatsumi; Keiji Suzumura; Yoshihide Suzuki, all of Aichi-ken, Japan

[73] Assignee: Aisin Seiki Kabushiki Kaisha, Kariya, Japan

[21] Appl. No.: 09/280,823

[22] Filed: Mar. 30, 1999

[30] Foreign Application Priority Data

Mar. 30, 1998 [JP] Japan .................................. 10-083440

[51] Int. Cl.[7] ...................................................... H02H 7/08
[52] U.S. Cl. ........................ 318/473; 318/434; 318/472; 318/471; 361/24; 361/25; 361/103
[58] Field of Search .................................. 318/430–480; 361/20–25, 100–104, 115, 116

[56] References Cited

U.S. PATENT DOCUMENTS

| | | | |
|---|---|---|---|
| 4,644,239 | 2/1987 | Yoshikawa et al. ..................... | 318/641 |
| 4,982,143 | 1/1991 | Gerschner et al. ...................... | 318/471 |
| 5,898,557 | 4/1999 | Baba et al. ............................... | 361/103 |
| 5,936,820 | 8/1999 | Umemura et al. ...................... | 361/103 |

*Primary Examiner*—Paul Ip
*Attorney, Agent, or Firm*—Sughrue, Mion, Zinn, Macpeak & Seas, PLLC

[57] ABSTRACT

A temperature sensor is located close to each of a plurality of switching elements. Each of the elements opens and closes a current supplying line from a power supply to a three phase SR motor. A generating circuit of a instruction value for the driving current of the motor generates a target value (It) of the driving current so as to achieve a requested power of the motor and an allowable value of the driving current on the basis of the highest temperature sensed by the temperature sensors. The circuit outputs the target value as an instruction value of the driving current when the target value is smaller than the allowable value and outputs the allowable value as an instruction value of the driving current when the target value is greater than the allowable value.

3 Claims, 3 Drawing Sheets

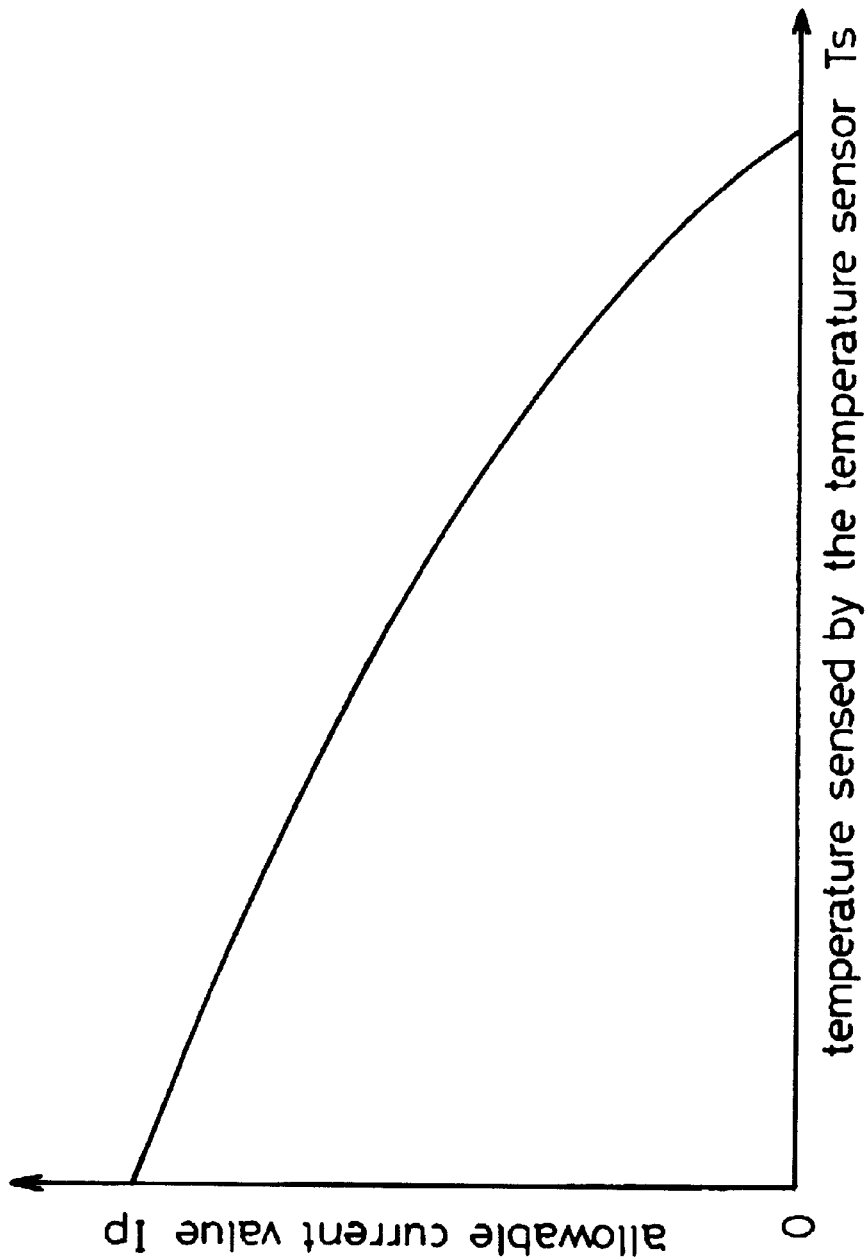

CURRENT SUPPLY CONTROLLER FOR AN ELECTRIC MOTOR

FIELD OF THE INVENTION

The invention relates to a current supply controller for an electric motor (e.g. an electric motor as a drive source of an electric vehicle) and in particular to the controller preventing switching element (switching transistor, e.g. gate insulated bipolar transistor), which opens and closes a current supplying line from a power supply to the motor, from heat breakdown.

DESCRIPTION OF THE PRIOR ART

JP 07(1995)-194094 A shows a conventional current supply controller for an electric motor wherein a temperature sensor is located near a switching element opening and closing an electric supplying line from a current supply to an electric motor. Alternatively, the temperature sensor is located in the switching element. When temperature sensed by the sensor is greater than a pre-determined temperature, the controller reduces the target value of the driving current supplied to the electric motor according to the pre-determined reducing rate calculated on the basis of the requested output of the motor. If the sensor is located near the switching element, the pre-determined temperature is slightly lower than the temperature where the switching element will be subject to heat break down. If the sensor is located in the switching element, the pre-determined temperature is slightly lower than the permissible temperature of the switching element. The reducing rate increases corresponding to the difference between the pre-determined temperature and the temperature sensed. When the actual temperature of the switching element gets to the upper limit on the temperature, the reducing rate 100% is taken on the basis of the sensed temperature representing the actual temperature, so that the target value of the driving current is set on 0 (zero).

The temperature of the switching element increases corresponding to the increase of the driving current supplied to the motor. Therefore, the reducing ratio is decided on the basis of the case where the maximum driving current is supplied to the motor so as to surely prevent the switching element from heat breakdown. Even when the actual driving current is smaller than the maximum driving current, the driving current is reduced according to the above reducing ratio it the sensed temperature or the switching element is over the pre-determined temperature. However, the temperature increase ratio under a relatively smaller driving current is smaller than the temperature increase ratio under maximum driving current, so that the actual temperature of the switching element under a relatively smaller driving current does not rapidly go over the permissible temperature. It unnecessarily limits the driving current and the motor output in that the driving current is reduced according to the above reducing ratio when the actual driving current is smaller than the maximum driving current.

SUMMARY OF THE INVENTION

It is an object of the invention to increase the electric motor output and protect the switching element of the motor from heat breakdown. The invention provides a current supply controller for the electric motor comprising a switching element opening and closing a current supplying line from a power supply to the motor, a current sensor detecting an actual driving current of the motor, a temperature sensor located close to the switching element, first means for generating and outputting an instruction value of the driving current of the motor on the basis of a signal representing a requested power output of the motor and a signal representing a temperature sensed by the temperature sensor, and second means for driving the switching element to turn the switching element ON and OFF so as to bring a value representing the actual driving current of the motor detected by the current sensor close to the instruction value of the driving current generated by the first means, wherein the first means decides a target value for the driving current on the basis of a signal representing a requested power output of the motor so as to achieve the requested power output and an allowable value of the driving current on the basis of the temperature sensed by the temperature sensor, that is, a maximum value of the driving current which can be supplied to the switching element without heat breakdown of the switching element, the first means outputs the target value of the driving current as an instruction value of the driving current when the target value of the driving current is smaller than the allowable value of the driving current, and the first means outputs the allowable value of the driving current as an instruction value of the driving current when the target value of the driving current is greater than the allowable value of the driving current. Therefore, the current supply controller of the electric motor of the invention is able to increase the electric motor output and to protect the switching element of the motor from heat breakdown.

The invention also provides a current supply controller of the electric motor wherein the first means for generating and outputting a instruction value of the driving current of the motor comprises a memory means containing a map of the allowable values of the driving current corresponding to each temperature of the switching means sensed by the temperature sensor and reads the allowable values from the map. The first means alternatively calculates the allowable values on the basin of the temperature sensed.

The invention also provides a current supply controller of the electric motor wherein the temperature sensor is located close to the switching element for opening and closing a current supplying line from a power supply to each coil of a multiphase motor and the highest temperature sensed by the temperature sensors is taken as representative temperature so as to be supplied to the first means. In such a case, the switching element is protected from heat breakdown although the driving current is supplied to only one phase coil of a multiphase motor.

DESCRIPTION OF THE DRAWINGS

FIG. 3 is a graph showing the relation between the temperature sensed by the temperature sensor and the allowable driving current applied to a switching element without heat breakdown.

DETAILED DESCRIPTION OF THE INVENTION

Figure 1:
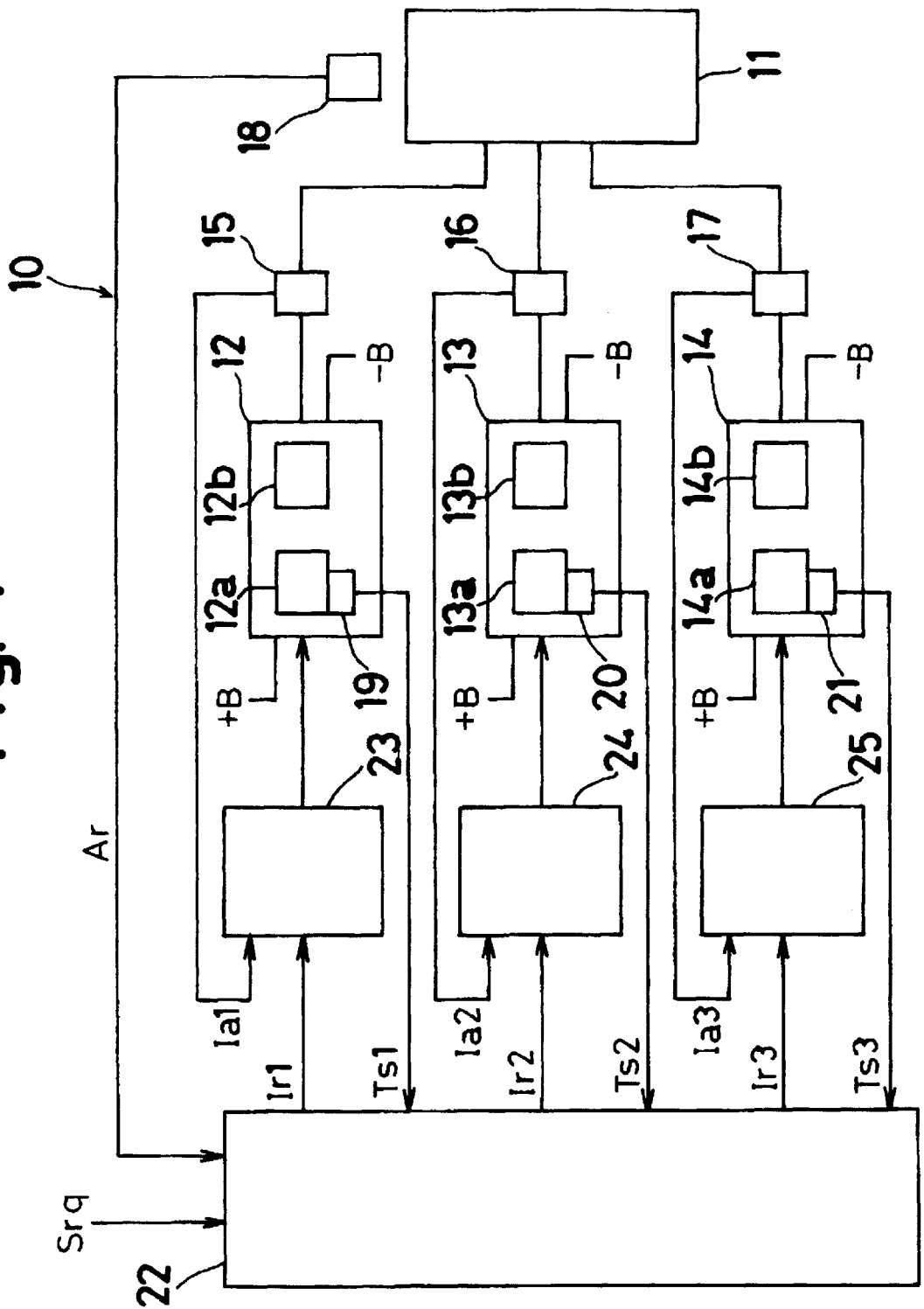
FIG. 1 is a block diagram of a current supply controller of a three-phased switched reluctance motor according to an embodiment of the invention.

FIG. 1 shows a current supply controller 10 of a three-phase switched reluctance motor (SR motor) provided as a drive source for an electric vehicle. The current supply controller 10 comprises a first driver 12, a second driver 13, a third driver 14, a first current sensor 15, a second current sensor 16 and a third current sensor 17. Each of the drivers 12, 13 and 14 comprises a pair of switching elements (IGBT) 12a, 12b, 13a, 13b and 14a, 14b to open and close a current supplying line from a direct current power supply B to each of a first, second and third phase (not shown) of the SR motor 11. Each of the current sensors 15, 16 and 17 senses an actual driving current of the first, second and third phase coil of the SR motor 11 s0 as to output an analogue signal (volt) Ia1. Ia2 and Ia3 representing each of the actual currents. The current supply controller 10 furthermore comprises a rotational angle sensor 18 like a resolver, first, second and third temperature sensors 19, 20 and 21, a generating circuit 22 for the instruction value of the driving current (first means for generating and outputting a instruction value of the driving current of the motor) and first, second and third driving circuits 23, 24 and 25 for the switching elements 12a, 12b, 13a, 13b and 14a, 14b (second means (23, 24, 25) for driving the switching element). The rotational angle sensor 16 senses a rotational angle of a rotor (not shown) of the SR motor 11 so as to output a digital signal Ar representing the angle. Since each temperature increase of the elements 12a, 13a and 14a is greater than that of the elements 12b, 13b and 14b, each of the temperature sensors 19, 20 and 21 is attached on the side or the bottom of each of the drivers 12, 13 and 14 where the switching elements 12a, 13a and 14a are located, so as to output analogue signals (volt) Ts1, Ts2 and Ts3 representing temperatures of the elements 12a, 13a and 14a thereon. The generating circuit 22 outputs instruction values (volts) Ir1, Ir2 and Ir3 of the driving current signals of the first, second and third phase coils of the SR motor 11. Each of the first, second and third driving circuits 23, 24 and 25 turns the switching elements 12a, 12b, 13a, 13b and 14a, 14b ON and OFF so as to bring the analogue signals Ia1, Ia2 and Ia3 close to the instruction signals Ir1, Ir2 and Ir3 of the driving current by comparison of both. Namely each of the circuits 23, 24 and 25 brings the actual values of the driving currents of the first, second and third phase coils of the SR motor 11 close to the target values of the driving currents.

The generating circuit 22 for the instruction values of the driving current receives a power output signal requested (e.g. a signal corresponding to an opening ratio of the accelerator) Srq of SR motor 11, the analogue signal Ar representing the rotational angle of the rotor and the analogue signals Ts1, Ts2 and Ts3. The generating circuit 22 comprises a microcomputer, non-refreshable (read only) memory, refreshable memory and an output circuit although they are not shown. The microcomputer calculates a target torque Ttq, a rotational speed Sp and the like for the SR motor 11. The non-volatile memory contains first, second and third maps. The first map is the target values It of the driving current corresponding to the target torque Ttq end the rotational speed Sp and numbers of the current supply patterns. The second map is allowable values of the driving current corresponding to the maximum value of the driving current that is allowed to be supplied to the switching element without heat breakdown thereof at the temperature of each sensor 19, 20 and 21, and numbers of the current supply patterns. The third map is current supply patterns, representing values of driving current at each rotational angle of the rotor, corresponding to the numbers of the current supply patterns. The volatile memory holds the current supply patterns of the first, second and third phases of the coil. The output circuit reads target values and allowable values of the driving current at each rotational angle of the rotor from the volatile memory and outputs them as the instruction values for the driving current.

Figure 2:
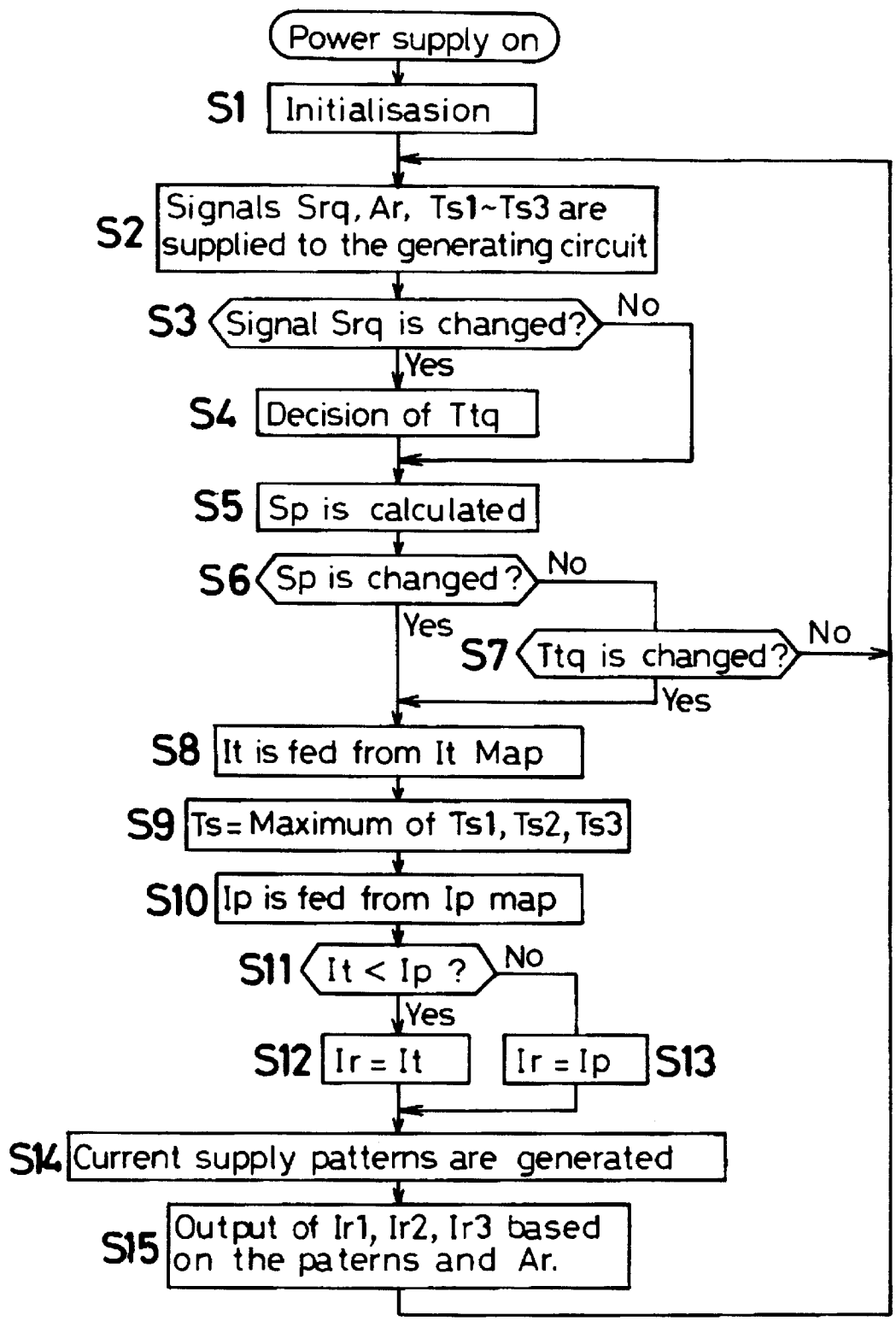
FIG. 2 is a flow chart carried out in the generating circuit of FIG. 1.

The flow-chart of FIG. 2 describes the function of the generating circuit 22 for the target value of the driving current. When the current supply controller 10 is booted, the generating circuit 22 is initialized at step S1. At step S2, the power output signal requested Srq, the output signal Ar of the rotational angle sensor 16 arid the output signals Ts1, Ts2 and Ts3 of the temperature sensors 19, 20 and 21 are supplied to the generating circuit 22. At step S3, it is judged and decided whether the request signal Srq has been changed. When the signal Srq has been changed, a target torque Ttq is decided on the basis of the request signal Srq and a flag representing the change of the target torque Ttq at step S4. At step 5, a rotational speed Sp of the SR motor 11 is calculated on the basis of the output signal Ar of the rotational angle sensor 18. At step S6, it is judged and decided whether the rotational speed Sq has been changed. When the rotational speed Sq has been changed, it proceeds to step S8. When the rotational speed Sq has not been changed at step S6, it is judged whether the flag representing the change of the target torque Ttq is ON. When the flag is ON, it proceeds to step S8. When the flag is not ON, it returns to step S2.

At step S8, a target value It of the driving current and a number of the current supply pattern selected from the first map (the target value It map of the driving current) on the basis of the target torque Ttq decided at step S4 and the rotational speed Sp calculated at step S5 are fed into the volatile memory. At step S9, the highest value of the analogue signal Ts1, Ts2 and Ts3 representing temperatures of the element 12a, 13a and 14a is considered as a temperature Ts sensed (representative temperature). At step S10, an allowable value Ip of the driving current and a number of the current supply pattern selected from the second map (the allowable value Ip map of the driving current) on the basis of the temperature Ts sensed are fed into the volatile memory. The second map (the allowable value Ip map of the driving current) is prepared on the basis of the relation between the temperature Ts sensed and the allowable value Ip of the driving current shown in FIG. 3. The allowable value Ip is calculated by the following expression:

$$Ip=(Tj-Ta) \text{ I Von·Rth}$$

Tj represents the upper limit temperature of the switching element. Von represents a voltage between emitter and collector while the switching element is ON. Rth represents heat resistance between the switching element and the temperature sensor.

At step S11, it is judged and decided whether the target value It of the driving current is smaller than the allowable value Ip of the driving current. When the former is smaller than the latter, the target value It is taken for the instruction value Ir of the driving current at step S12 and it proceeds to the step S14. When the target value It is not smaller than the allowable value Ip, the target value Ip is taken for the instruction value Ir of the driving current at step S12 and it proceeds to step S14. At step S14, each current supply pattern of the first, second and third phase coil of the SR motor 11 is generated on the basis of the instruction value Ir taken at step S12 or step S13 and the number of the current supply pattern. At step S15, each instruction value Ir1, Ir2 and Ir3 of the first, second and third phase coifs of the SR motor 11 is output on the basis of each current supply pattern and the rotational angle signal Ar and the program returns to step 32.

In the above embodiment of FIG. 1, each of the drivers 12, 13 and 14 comprises a pair of switching elements but an electric motor could be controlled by a sole switching element. The invention can be applied to the latter. The driver of the electric motor can be located on a cooling means (e.g. cooling plate) and a cooling medium flows through the cooling means. In this case the cooling medium flow should be controlled to increase in quantity in proportion to the increase of the sensed temperature of the switching means.

While the preferred embodiments have been described, variations thereto will occur to those skilled in the art within the scope of the present inventive concepts which are delineated by the following claims.

What is claimed is:

1. A current supply controller for an electric motor comprising:

a switching element (12a, 12b; 13a, 13b; 14a, 14b) opening and closing a current supply line from a power supply to the motor (11), a current sensor (15, 16, 17) detecting an actual driving current of the motor, a temperature sensor (19, 20, 21) located close to the switching element, first means (22) for generating and outputting an instruction value of the driving current of the motor on the basis of a signal representing a requested power output of the motor and a signal representing a temperature sensed by the temperature sensor, and second means (23, 24, 25) for driving the switching element to turn the switching element ON and OFF so as to bring a value representing the actual driving current of the motor detected by the current sensor close to the instruction value of the driving current generated by the first means, wherein the first means decides a target value (It) of the driving current on the basis of a signal representing a requested power output of the motor so as to achieve the requested power output and an allowable value (Ip) of the driving current on the basis of the temperature sensed by the temperature sensor, that is a maximum value of the driving current which can be supplied to the switching element without heat breakdown of the switching element, the first means outputs the target value (It) of the driving current as an instruction value of the driving current when the target value (It) of the driving current is smaller than the allowable value (Ip) of the driving current, and the first means outputs the allowable value (Ip) of the driving current as an instruction value of the driving current when the target value (It) of the driving current is greater than the allowable value (Ip) of the driving current.

2. A current supply controller according to the claim 1, wherein the first means (22) for generating and outputting an instruction value of the driving current of the motor comprises a memory means containing a map of allowable values of the driving current corresponding to each temperature of the switching means sensed by the temperature sensor and reads the allowable values from the map.

3. A current supply controller according to the claim 1, wherein the temperature sensor is located close to the switching element opening and closing a current supplying line from a power supply to each coil of multiphase motor and the highest temperature sensed by the temperature sensors is taken as a representative temperature so as to be supplied to the first means.

* * * * *